US012708992B2

(12) United States Patent
Altun et al.

(10) Patent No.: US 12,708,992 B2
(45) Date of Patent: Aug. 18, 2026

(54) METHOD FOR PROVIDING KEY FIGURES TO A USER OF AT LEAST ONE POWER TOOL

(71) Applicant: Robert Bosch GmbH, Stuttgart (DE)

(72) Inventors: Cankal Altun, Stuttgart (DE); Jan Koegel, Zusmarshausen (DE); Abhimanyu Sharma Marupaka, Leinfelden-Echterdingen (DE); Amandeep Bedi, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 208 days.

(21) Appl. No.: 18/540,047

(22) Filed: Dec. 14, 2023

(65) Prior Publication Data

US 2024/0208025 A1 Jun. 27, 2024

(30) Foreign Application Priority Data

Dec. 21, 2022 (DE) ..................... 10 2022 214 205.5

(51) Int. Cl.
*B25F 5/00* (2006.01)

(52) U.S. Cl.
CPC ..................................... *B25F 5/00* (2013.01)

(58) Field of Classification Search
CPC ................ B25F 5/00; G06Q 10/06398; G06Q 10/06393; G06Q 10/06395
USPC ........................................................ 705/3-44
See application file for complete search history.

(56) References Cited

U.S. PATENT DOCUMENTS

| | | | | |
|---|---|---|---|---|
| 7,778,865 | B1 | 8/2010 | Kane | |
| 10,631,120 | B2 | 4/2020 | Burch et al. | |
| 11,486,230 | B2 * | 11/2022 | Tawil | E21B 41/00 |
| 11,794,716 | B2 * | 10/2023 | Shively | F04D 13/06 |
| 2005/0044051 | A1 * | 2/2005 | Selby | G06Q 99/00 705/500 |
| 2006/0155582 | A1 * | 7/2006 | Brown | A61B 5/0002 600/300 |

(Continued)

FOREIGN PATENT DOCUMENTS

| | | | | |
|---|---|---|---|---|
| DE | 10 2019 220 070 A1 | | 6/2021 | |
| EP | 2555888 B1 | * | 6/2014 | B21J 7/16 |

(Continued)

OTHER PUBLICATIONS

Vedder et al "A multi-level systems approach for the development of tools, equipment and work processes for the construction industry", Jan. 2005, Applied Ergonomics, pp. 471-780 (Year: 2005).*

*Primary Examiner* — Romain Jeanty
(74) *Attorney, Agent, or Firm* — Maginot, Moore & Beck LLP

(57) ABSTRACT

A method for providing key figures to a user of at least one power tool, includes collecting data values relating to the at least one power tool and/or relating to the user of the at least one power tool, wherein the data values are at least partially associated with an activity of the user with the at least one power tool. The method further includes ascertaining at least one key figure for the user on the basis of the collected data values and an evaluation function, the key figure is being specific to the quality of the user's activities with the at least one power tool, and outputting the at least one of the ascertained key figures for the user.

11 Claims, 3 Drawing Sheets

(56) References Cited

U.S. PATENT DOCUMENTS

| | | | | |
|---|---|---|---|---|
| 2013/0138465 | A1* | 5/2013 | Kahle | G06Q 10/063114 705/7.17 |
| 2013/0285302 | A1* | 10/2013 | Helm | B25H 1/04 269/293 |
| 2015/0371172 | A1 | 12/2015 | Minter | |
| 2016/0080038 | A1* | 3/2016 | Breitenbach | B25F 5/02 455/41.1 |
| 2019/0066029 | A1 | 2/2019 | Hancock et al. | |

FOREIGN PATENT DOCUMENTS

| | | | | |
|---|---|---|---|---|
| EP | 2829658 | A1 * | 1/2015 | E01C 23/094 |
| KR | 10-2021-0086207 | A | 7/2021 | |
| WO | WO-2016127930 | A1 * | 8/2016 | B25F 5/006 |
| WO | WO-2017025247 | A1 * | 2/2017 | B25F 5/00 |
| WO | WO-2018177671 | A1 * | 10/2018 | B25F 5/02 |

* cited by examiner

METHOD FOR PROVIDING KEY FIGURES TO A USER OF AT LEAST ONE POWER TOOL

This application claims priority under 35 U.S.C. § 119 to patent application number DE 10 2022 214 205.5, filed on Dec. 21, 2022 in Germany, the disclosure of which is incorporated herein by reference in its entirety.

The present disclosure relates to a method for providing key figures to a user of at least one power tool. The disclosure also relates to a computer program and a device for this purpose.

BACKGROUND

For construction projects, finding the right tradespeople with sufficient expertise and trustworthy experience can be an arduous task. When searching for a specific project, people usually use portals, adverts or telephone calls to select a suitable tradesman at a fair price. However, the available information or references with regard to qualifications and technical experience are not always credible or accurate. Therefore, from the customer's point of view, there is often a lack of reliable and resilient evaluations of tradespeople in order to convince the customer with demonstrably reliable tradesperson expertise and fair pricing.

Although various solutions are known for authenticating tradespeople when working with power tools, these solutions cannot eliminate the known shortcomings of today's tradesman portals or job markets for tradespeople. It is also known from U.S. Pat. No. 10,631,120 B2 that data can be provided by a power tool. However, the data collected cannot be used to evaluate a craft activity.

SUMMARY

The subject matter of the disclosure is a method having the features described herein, a computer program having the features described herein, and a device having the features described herein. Further features and details follow from the description and the drawings. Of course, features and details described in the context of the method according to the disclosure also apply in the context of the computer program according to the disclosure and the device according to the disclosure, and respectively vice versa, so mutual reference is or can always be made with respect to the disclosure of the individual aspects of the invention.

A method according to the disclosure is used to provide key figures for a user of at least one power tool, comprising the following steps:

- collecting data values relating to the at least one power tool and/or relating to the user of the at least one power tool. In particular, it is intended that the data values are at least partially assigned to an activity of the user with the at least one power tool,
- ascertaining at least one key figure for the user on the basis of the collected data values and an evaluation function, wherein the key figure is specific to the quality of the user's activities with the at least one power tool,
- outputting of the at least one of the ascertained key figures to the user.

This has the advantage that an evaluation or assessment of the activities of a user of a power tool or a craftsman can be significantly improved and made significantly more transparent. The method according to the disclosure creates a rating system that is very easy to check and trustworthy for the user and his customers. The user of a tool or craftsman and his customers can thus advantageously recognize more easily and quickly what quality the user can deliver and provide when carrying out manual activities.

A key figure is also to be understood as a regulation for the quantitative and objective measurement of an activity that provides information about a status or performance. Furthermore, a key figure can provide objectification of assessments or evaluations on the basis of agreed measurement criteria. The respective key figures can be logically or hierarchically related to each other in different ways.

An evaluation function is to be understood as an application program or as a part of such a program for analyzing data. It comprises one or more algorithms that can be used to evaluate data, e.g., to ascertain a key figure. For this purpose, one or more criteria can be predefined for the evaluation function as variables of the function in order to ascertain a specific key figure based on them. This means that a computer program or an evaluation function of the program or an evaluation unit of a data processing device can ascertain one or more key figures.

The key figure can be output, for example, on a user interface of a computer or a web browser. It is also conceivable that the key figure can be visualized alone or as part of a user profile on a web portal user interface. The key figure can be output, for example, as a transmission or transfer of the key figure to a display device such as a screen or as a transmission to a cloud-based or internet-based device such as a web portal page.

Data values can comprise measured values from power tools or measuring tools or so-called smart wearables. Such a measured value is measured by means of a sensor or an acquisition device of a power tool, stored if necessary and then sent by the power tool to a device for data processing in order to be processed there, for example using a program. Data values can also be loaded, retrieved, sent or collected from data sources such as data storage or databases for further processing. A smart wearable is a portable technology that can be integrated into a wearable device or an item of clothing. Smart means that such a device can send and receive data via the internet as a communication network.

In the context of the present disclosure, a power tool is to be understood as a tool that can be designed as a hand-held, hand-guided, transportable or stationary power tool. The power tool can also be designed as an electronic measuring tool. A power tool can be wired, i.e., with a power cable or a direct connection to the power grid, or wireless, i.e., with a battery without a direct connection to the power grid. Power tools, optionally also digital power tools, can be, for example, an electric drill or grinder, jigsaw or circular saw, electric screwing tool such as a cordless screwdriver, electronic distance measuring device, electronic levelling device, or an electric voltage or current measuring device.

A type of power tool can be understood as a kind, class or even genus of a power tool. For example, one type may be hand-held or hand-guided power tools, while another type may be stationary power tools. Furthermore, the type of power tool can also be a measuring tool or device.

It may optionally be possible for the output of the at least one of the ascertained key figures to comprise the following step:

- displaying the at least one key figure on a user interface, wherein the user interface visualizes a digital twin of the user.

This provides the user with immediate information through simpler and faster visualization on the user interface.

A digital twin can represent a real object or a real person in the digital world. These may be tangible or intangible objects. A digital twin comprises data and algorithms and can be linked to the real world via a sensor. Real objects can be mapped with data and algorithms as digital twins, as they can describe the properties and behavior of a real object under certain conditions. The objects depicted in a digital twin can be a tangible or intangible object such as a product, a service or a person. A digital twin can comprise a real object to be depicted, a virtual representation space and data on the environmental conditions. A digital twin can also be understood as one or more key figures for a user of a power tool.

The key figure can be displayed visually on a user interface, in particular on a graphical user interface, of a computer or a mobile device. The key figure can be displayed on a web browser, for example. It is also possible for the key figure to be displayed on a service provider's web portal to third parties via the internet.

It is also conceivable within the scope of the disclosure that a computer-aided authorization of a user is carried out in order to gain access to the user interface.

This has the advantage that the provided key figure with security-sensitive data relating to the user is only made available to a specific group of customers or evaluators and their data is therefore better protected.

Authorization, in particular computer-based authorization, is to be understood as permitting, assigning or checking access rights to data and services by means of special methods with regard to interested users. Such authorization can be carried out by an authorization unit of a data processing device or an authorization component of a computer program.

According to a further possibility, it can be provided that the predefined evaluation function ascertains the at least one key figure on the basis of the collected data values, wherein the key figure is preferably designed as at least one of the following key figures for an evaluation of the quality:

- expertise of a user with a specific type of power tool,
- expertise of a user for a specific trade,
- flexibility and responsiveness of a user for projects under time pressure,
- price-performance ratio.

This has the advantage that a simpler and more objective evaluation can be guaranteed.

Expertise, in particular technical expertise, can be said to exist if the user, especially the craftsman, is well versed in his field of activity as a craftsman and has acquired specific knowledge for it. Expertise can be determined, for example, by criteria such as work efficiency, specialist knowledge or the ability to implement the user's experience.

A trade can be understood as manual and technical construction work in the building industry. The trade generally comprises work that can be assigned to a self-contained construction service area. . . . Typical trades can be, for example, electrical installation work, carpentry and timber construction work, drywall construction work, metal construction or forging work, concrete and reinforced concrete work or carpentry work.

It may be provided in the context of the disclosure that the evaluation function analyses and evaluates the collected data values on the basis of a multidimensional data model, wherein one dimension specifies the collected data values from different perspectives, preferably time and/or region and/or company and/or competition and/or industry and/or market, and/or that the data values are received from different data sources, wherein the evaluation function takes into account the collected data values from the different data sources for the evaluation.

This enables a more comprehensive, more meaningful and more compact presentation of a key figure on the quality level from the evaluation. This also has the advantage that the data can be accessed much more quickly and handling the data for the evaluation is simplified.

A multidimensional data model or multidimensional data model is to be understood as a method with which data can be organized.

The basic idea of a multidimensional data model is the distinction between facts, dimensions and classification hierarchies. A multidimensional cube is used for better understanding. Facts are points in multidimensional space and classification hierarchies represent axis labels/coordinates in varying degrees of refinement. Dimensions relate key figures to properties or factual criteria and enable the data to be structured.

Facts can be measured values, for example. A dimension has a scheme such as by time with day, week, year or by region with county, country, state or by product such as product group, product class, product family and associated values. Dimensions thus describe data and enable access to key figures. Dimensions reflect a certain point of view according to which facts are broken down. A dimension can therefore also be understood as a viewing perspective. The dimensions can in turn be condensed into hierarchies such as month-quarter-year. In simple hierarchies, the higher hierarchy levels contain the aggregated data values of the lower level.

Preferably, in the context of the disclosure, it may be provided that the evaluation function comprises one or more of the following data mining functions for the analysis of the data values: an encryption function, a standardization function, a harmonization function, an aggregation function, a k-anonymity function or a data masking function.

This has the advantage that by using one or more of these functions, a more reliable and qualitatively more valuable analysis and/or evaluation can be ensured with regard to the quality of the user's manual activities.

The disclosure also relates to a computer program, in particular a computer program product, comprising instructions that, when the computer program is executed by a computer, prompt said computer program to carry out the method described above. The computer program thus brings with it the same advantages as have been described in detail with reference to a method.

The computer can, e.g., be designed as a data processing device which executes the computer program. The computer can comprise at least one processor for executing the computer program. A non-volatile data memory can also be provided, in which the computer program can be stored and from which the computer program can be read by the processor for execution.

The disclosure can also relate to a computer-readable storage medium which comprises the computer program. The storage medium is, e.g., designed as a data store, such as a hard drive and/or a non-volatile memory and/or a memory card. The storage medium can, e.g., be integrated into the computer.

The method according to the disclosure can moreover also be executed as a computer-implemented method.

BRIEF DESCRIPTION OF THE DRAWINGS

Further advantages, features and details of the disclosure will emerge from the following description, in which exemplary embodiments of the disclosure are described in detail with reference to the drawings. The features mentioned in the claims and in the description can each be present in various embodiments individually or in any combination. Shown are:

In the following drawings, identical reference signs are used for identical technical features, even in different exemplary embodiments.

DETAILED DESCRIPTION

The disclosure includes creating a points system that can be used by a craftsman to show his customers how much experience he has in terms of time, tools, applications, projects or locations. On the other hand, the same system can also be used by customers to find a suitable tradesman for a specific job based on the key figures displayed. You can also use the same system to see, check and rate the craftsman on how he has done his job.

Figure 1A:
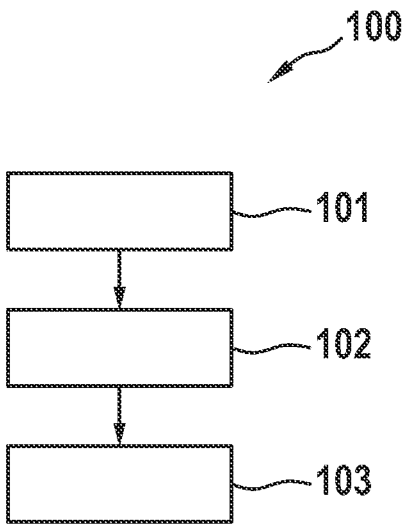
FIG. 1*a*: an example of a method according to the disclosure.

To carry out the method according to the disclosure, data or data values can be collected, for example, from intelligent machines such as power tools, from a cloud device or by means of social media in order to ascertain a key figure. The collected data is analyzed and evaluated. Such a data analysis can also comprise, for example, statistical data from other data stores or databases in order to determine a valuation using one or more key figures. Furthermore, when performing the method according to the disclosure, verifiable and/or certified and/or quantifiable data about the work performed by a craftsman can be collected FIG. 1*a* shows a schematic example of a method according to the disclosure. FIG. 1*a* shows a method according to the disclosure for providing key figures to a user of at least one power tool, wherein the following steps are carried out. In step 101, data values are first collected with respect to the at least one power tool and/or with respect to the user of the at least one power tool, wherein the data values are at least partially associated with an activity of the user with the at least one power tool. Subsequently, in step 102, at least one key figure for the user is ascertained on the basis of the collected data values and an evaluation function, wherein the key figure is specific to the quality of the user's activities with the at least one power tool. Then, in step 103, the at least one of the ascertained key figures is output for the user.

Figure 1B:
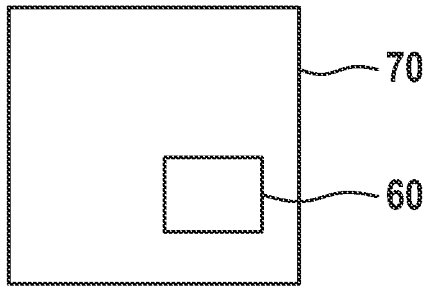
FIG. 1*b*: an example of a method according to the invention.

FIG. 1*b* illustrates a computer program 60 comprising instructions which, when the program is executed by a computer 70, cause the computer 70 to perform the steps of the method 100 according to exemplary embodiments of the disclosure. Also illustrated is a data processing device 70, wherein said data processing device 70 may comprise means for performing the steps of a method 100 according to exemplary embodiments of the disclosure.

Figure 2:
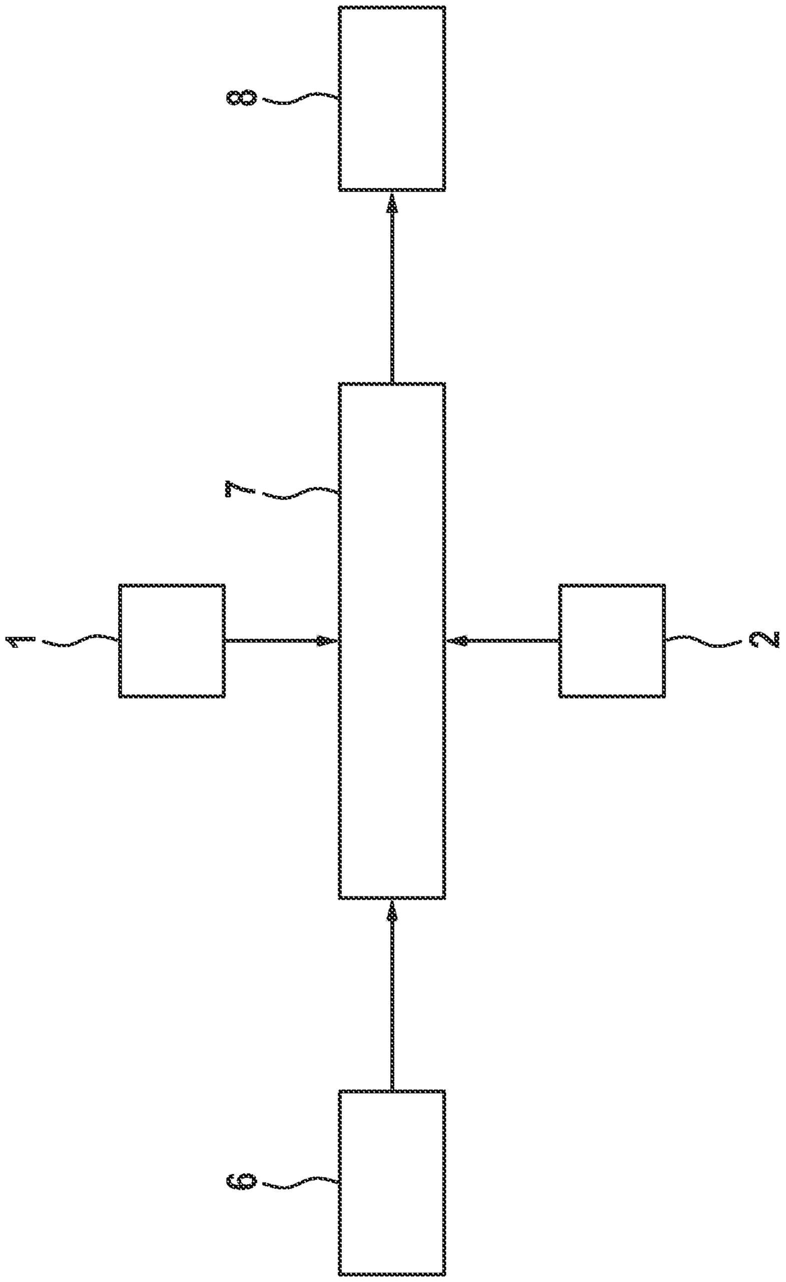
FIG. 2: a further example of a method according to the invention.

FIG. 2 shows a schematic overview as an example, which shows which data 1,2 can be used to ascertain a key figure. FIG. 2 also shows how the data 1,2 can be processed. The data comprises information relating to data relating to the user, in particular the craftsman, 1, data relating to the power tool 2.

FIG. 2 shows that data 1,2 is first collected 6 and then processed using an evaluation function 7, in particular an algorithm 7, in such a way that a key figure can be ascertained and visualized 8. All verifiable and/or certified and/or quantifiable and/or raw data is collected automatically. This also includes data on the activities carried out by a user, in particular a worker or craftsman.

The collected data 1,2 can then be evaluated within the framework of data evaluation, using a predefined algorithm as a key figure to ascertain the quality of the user's activities. This can optionally take the form of a digital twin 8 for the user.

As part of the data analysis, further or extended information regarding the quality can be generated on the basis of a so-called complex analysis and/or other analysis methods. The complex analysis takes into account a multidimensional data model, for example. In addition, findings from a cognitive analysis, i.e., including data from other users or other markets, for example, can be used to ascertain one or more key figures. Optionally, machine learning methods can also help to decide which data to integrate in order to determine key figures. The algorithm can be self-learning or supported by artificial intelligence.

Depending on the result of the analysis, the key figure for a user can be summarized with a score, for example, to represent quality-oriented activity. In other words, data is collected, analyzed and evaluated using one or more algorithms and key quality indicators are determined that can be visualized 8. In other words, data is collected, analyzed and evaluated using one or more algorithms and key quality indicators are determined that can be visualized 8.

Based on the automated data acquisition and evaluation of the user's power tools in use, changes to one or more key figures can be adjusted immediately, i.e., in real time.

Individual key figures can be customized by the user depending on the target group, i.e., certain key figures relating to quality can be hidden or shown, for example, by means of a filter mechanism on the user interface of a computer or a respective portal or program. It is also possible for this to be carried out on a mobile device such as a tablet computer or smartphone.

Figure 3:
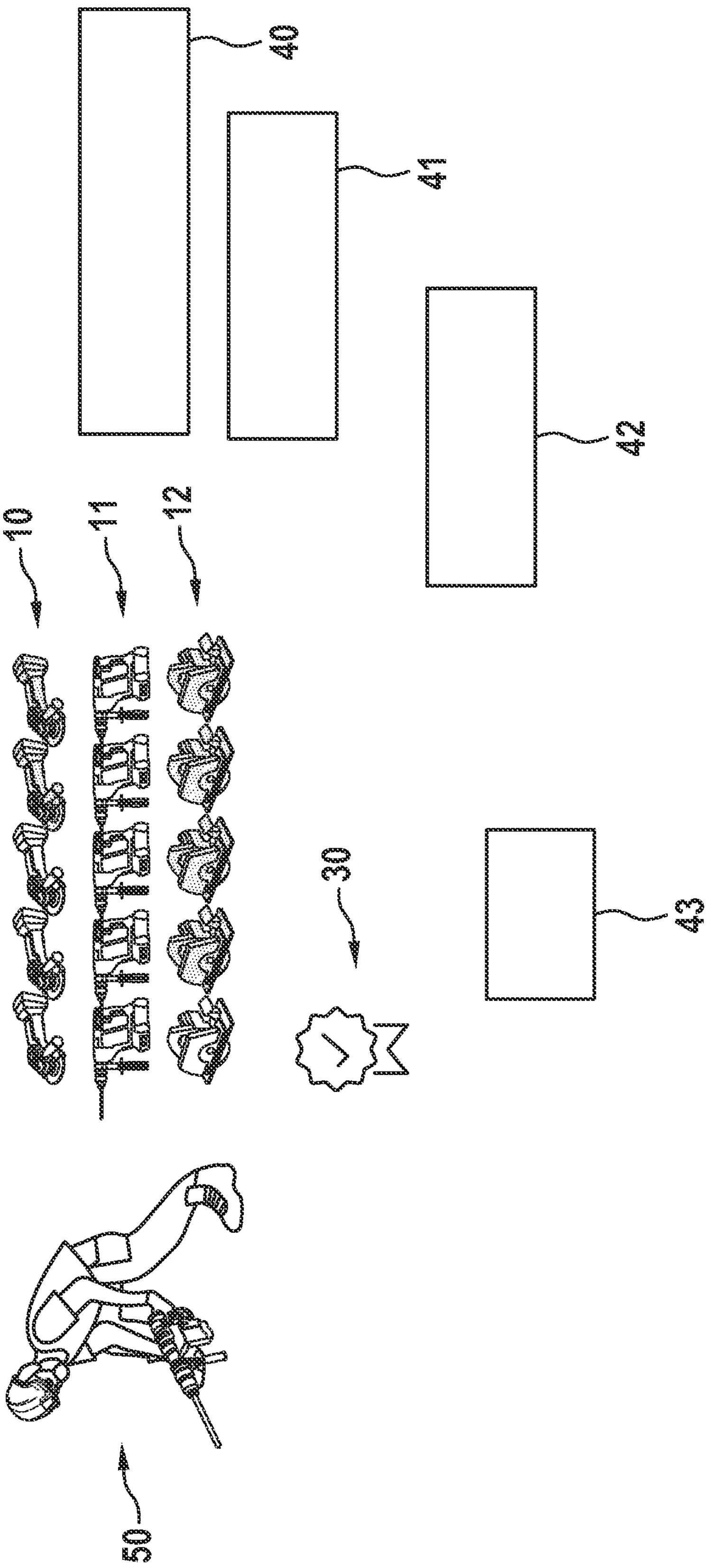
FIG. 3 is another example of a method according to the invention.

Furthermore, for example, an input link 30 as shown in FIG. 3 can be provided so that a customer can enter feedback in the form of a rating. In this way, he can influence a quality and experience-oriented assessment of the craftsman or worker. At the same time, the evaluation can be relatively confirmed by evaluating the data acquired from the at least one power tool during the activities at the customer's premises. This can make the proof of objectivity of the customer's assessment more transparent and significantly improve it by using the method according to the disclosure.

FIG. 3 shows an example of a visualization of several key figures for the craftsman. The craftsman is shown as symbol 50.

Key FIGS. 10, 11, 12, 20 are shown for an assessment of quality, in particular expertise and experience. These key figures can, for example, be displayed on a user interface of a computer or a web portal. A first key FIG. 10 is graphically represented as a key figure for competence and expertise in angle grinding in the form of angle grinder symbols. The number of colored symbols is three out of a maximum of five. This means, for example, that the craftsman has above-average experience.

A further key FIG. 11 is shown for the assessment of expertise in handling hammer drills, with the expertise level shown with five out of five possible hammer drill symbols as the maximum possible rating, i.e., expert in hammer drills. A third key FIG. 12 is shown graphically for the assessment of expertise in handling circular saws. The scoring is shown here with circular saw symbols. In this example, one of five possible symbols is shown in color, which means that the craftsman concerned is classified as a beginner in the use of circular saws. For the key FIGS. 10, 11, 12, the more symbols are displayed in color, the better the rating for the craftsman.

An input link 30 is displayed on the user interface, which offers the option of entering a rating for the craftsman when the link shown as an icon 30 is clicked.

Furthermore, for each of the displayed key FIGS. 10, 11, 12, at least one additional piece of detailed information is stored in a display window 40, 41, 42, 43 with respect to the respective key FIG. 10, 11, 12. The detailed information can also be displayed optionally, e.g., via a web link 40, 41, 42, 43.

The explanation hereinabove of the embodiments describes the present disclosure solely within the scope of examples. Of course, individual features of the embodiments can be freely combined with one another, if technically feasible, without leaving the scope of the present disclosure.

The invention claimed is:

1. A method of operating a power tool, comprising:

collecting data values relating to (i) at least one first parameter of the power tool as the power tool is operated by a user during an activity, and (ii) at least one second parameter of the user as the power tool is operated by the user during the activity;

ascertaining at least one key figure based on the data values using an evaluation function, the at least one key figure identifying a quality of the activity performed using the power tool by the user;

outputting the at least one key figure to the user; and changing, based on the at least one key figure, an operation of the power tool during a subsequent activity, such that a quality of the subsequent activity is optimized, wherein the at least one first parameter is collected by a sensor and/or an acquisition device of the power tool, wherein the at least one second parameter of the user is collected by a smart wearable worn by the user and operably connected to the power tool, wherein the at least one key figure is ascertained by at least one processor that is (i) included in the power tool and/or the smart wearable, or (ii) operably connected to the power tool and/or the smart wearable; and wherein outputting the at least one key figure includes displaying visually the at least one key figure on a graphical user interface.

2. The method according to claim 1, the graphical user interface visualizes a digital twin of the user.

3. The method according to claim 2, further comprising:

carrying out a computer-based authorization of the user in order to gain access to the graphical user interface.

4. The method according to claim 1, wherein the at least one key figure includes:

an expertise of the user with the power tool, an expertise of the user for a specific trade, a flexibility and a responsiveness of the user for projects under time pressure, and a price-performance ratio.

5. The method according to claim 1, wherein:

the evaluation function analyzes and evaluates the data values based on a multidimensional data model, one dimension of the multidimensional data model specifies the data values from different perspectives, and the different perspectives include at least one of time, region, company, competition, industry, and market.

6. The method according to claim 1, wherein the evaluation function comprises one or more data mining functions for analysis of the data values including: an encryption function, a standardization function, a harmonization function, an aggregation function, a k-anonymity function, and a data masking function.

7. The method according to claim 1, wherein:

the data values are collected from different data sources including the smart wearable, the sensor, and the acquisition device, and the evaluation function takes into account the data values that are collected from the different data sources for ascertaining the at least one key figure.

8. The method according to claim 1, further comprising:

automatically changing the at least one key figure in real time based on the data values.

9. The method according to claim 1, wherein the power tool is an electric drill, a grinder, a jigsaw, a circular saw, a power screwdriver, an electronic distance measuring device, an electronic leveling device, or an electric voltage or current measuring device.

10. A non-transitory non-volatile data memory comprising:

a computer program including instructions that, when the computer program is executed by a computer, cause the computer to perform the method according to claim 1.

11. A data processing device comprising:

a processor; and a non-transitory non-volatile data memory comprising program instructions, which, when executed by the processor, cause the processor to execute the method according to claim 1.

* * * * *